(12) United States Patent
Alfieri et al.

(10) Patent No.: US 8,429,661 B1
(45) Date of Patent: Apr. 23, 2013

(54) MANAGING MULTI-THREADED FIFO MEMORY BY DETERMINING WHETHER ISSUED CREDIT COUNT FOR DEDICATED CLASS OF THREADS IS LESS THAN LIMIT

(75) Inventors: Robert A. Alfieri, Chapel Hill, NC (US); Marcio T. Oliveira, San Jose, CA (US)

(73) Assignee: Nvidia Corporation, Santa Clara, CA (US)

( * ) Notice: Subject to any disclaimer, the term of this patent is extended or adjusted under 35 U.S.C. 154(b) by 1625 days.

(21) Appl. No.: 11/304,959

(22) Filed: Dec. 14, 2005

(51) Int. Cl.
*G06F 9/46* (2006.01)
*G06F 13/00* (2006.01)

(52) U.S. Cl.
USPC .......................................... 718/104; 711/147

(58) Field of Classification Search .................. 718/104, 718/102; 711/147
See application file for complete search history.

(56) References Cited

U.S. PATENT DOCUMENTS

| | | | | |
|---|---|---|---|---|
| 5,555,256 A | * | 9/1996 | Calamvokis | 370/399 |
| 5,684,974 A | * | 11/1997 | Onodera | 711/202 |
| 5,826,081 A | * | 10/1998 | Zolnowsky | 718/103 |
| 6,178,473 B1 | * | 1/2001 | Bonola | 710/54 |
| 6,918,119 B2 | | 7/2005 | Haller et al. | |
| 7,634,500 B1 | | 12/2009 | Raj | |
| 2001/0047439 A1 | * | 11/2001 | Daniel et al. | 710/52 |
| 2004/0034743 A1 | * | 2/2004 | Wolrich et al. | 711/132 |
| 2004/0184470 A1 | * | 9/2004 | Holden | 370/412 |
| 2004/0260888 A1 | * | 12/2004 | Hoogerbrugge et al. | 711/147 |
| 2005/0114612 A1 | | 5/2005 | Bombal | |
| 2006/0179274 A1 | | 8/2006 | Jones et al. | |
| 2006/0236011 A1 | * | 10/2006 | Narad et al. | 710/240 |
| 2006/0277126 A1 | * | 12/2006 | Rosenbluth et al. | 705/35 |

OTHER PUBLICATIONS

Office Action in U.S. Appl. No. 11/760,697, mailed Dec. 21, 2010.

\* cited by examiner

*Primary Examiner* — Meng An
*Assistant Examiner* — Brian Chew
(74) *Attorney, Agent, or Firm* — Patterson & Sheridan, LLP

(57) ABSTRACT

Systems and methods storing data for multi-threaded processing permit multiple execution threads to store data in a single first-in first-out (FIFO) memory. Threads are assigned to classes, with each class including one or more threads. Each class may be allocated dedicated entries in the FIFO memory. A class may also be allocated shared entries in the FIFO memory. The shared entries may be used by any thread. Data for a first thread may be stored in the FIFO memory while data for a second thread is read from the FIFO memory, even when the first thread and the second thread are not in the same class. The FIFO memory is shared between the threads to conserve die area, however each thread may be executed independently, as if each thread has a dedicated FIFO memory.

18 Claims, 13 Drawing Sheets

MANAGING MULTI-THREADED FIFO MEMORY BY DETERMINING WHETHER ISSUED CREDIT COUNT FOR DEDICATED CLASS OF THREADS IS LESS THAN LIMIT

BACKGROUND OF THE INVENTION

1. Field of the Invention

Embodiments of the present invention generally relate to data storage for multi-threaded processing and, more specifically, to using a first-in first-out (FIFO) memory to store the data.

2. Description of the Related Art

Conventional multi-threaded processing systems use a separate FIFO memory to store data for each processing thread. Using separate FIFOs permits data for a thread to be accessed independently from data for another thread. This independence is essential since during multi-threaded processing, each thread may be executed at a different rate and data may be stored in or read from the FIFOs at different rates. However, using separate FIFOs for each thread uses more die area than using a single FIFO to store data for multiple threads.

Accordingly, there is a desire to use a shared FIFO to store data for multiple threads, while permitting the data for each thread to be accessed independently.

SUMMARY OF THE INVENTION

The current invention involves new systems and methods for storing data for multi-threaded processing. A single FIFO memory is used to store data for multi-threaded processing. Threads are assigned to classes, with each class including one or more threads. Each class may be allocated dedicated entries in the FIFO memory. A class may also be allocated shared entries in the FIFO memory. The shared entries may be used by any thread. The allocation of entries to each class may be changed dynamically while the FIFO memory is in use. Data for a first thread may be stored in the FIFO memory while data for a second thread is read from the FIFO memory, even when the first thread and the second thread are not in the same class. The FIFO memory is shared between the threads to conserve die area, however each thread may be executed independently, as if each thread has a dedicated FIFO memory.

Various embodiments of a method of the invention for storing data for multiple execution threads in a FIFO (first-in first-out memory) storage include issuing a sender credit to a sender, receiving data for a first thread of the multiple execution threads from the sender, obtaining a pointer to an entry in the FIFO storage, storing the data in the entry, and storing the pointer in an ordered list of pointers corresponding to the first thread. The sender credit indicates that at least one entry is available in the FIFO storage to store the data. The pointer to an entry in the FIFO storage is obtained from a free pointer list that includes pointers to entries in the FIFO storage that are available to store data for the multiple execution threads.

Various embodiments of the invention include a system for storing data for multiple execution threads. The system includes a sender interface, a FIFO (first-in first-out memory) storage, a receiver interface, and an ordered pointer list. The sender interface is configured to receive data for the multiple execution threads. The FIFO (first-in first-out memory) storage is coupled to the receiver interface and is configured to store the data for the multiple execution threads. The receiver interface is coupled to the FIFO storage and is configured to output data from the FIFO storage. The ordered pointer list is coupled to the FIFO storage and is configured to store free pointers corresponding to entries in the FIFO storage that are available to store data in a first portion storing and to store pointers corresponding to entries in the FIFO storage that store data for the multiple execution threads in a second portion.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

The current invention involves new systems and methods for storing data for multi-threaded processing. Instead of using a separate FIFO memory to store data for each thread, a single FIFO memory is used to store data for multiple threads. The FIFO memory is shared between the threads to conserve die area, however each thread may be executed independently, as if each thread has a dedicated FIFO memory. A multi-threaded FIFO memory including the single FIFO memory may be used to perform real-time processing for one or more threads, but specifying those threads as having a higher priority for accessing the multi-threaded FIFO. The multi-threaded FIFO memory may also be used to sort out of order data. For example, each DRAM (dynamic random access memory) page may be assigned a different thread identifier and the data for each page may be popped from the single FIFO memory to reduce any latency incurred accessing the DRAM. In other circumstances the multi-threaded FIFO memory may be used to avoid deadlock conditions in a processing pipeline.

Figure 1A:
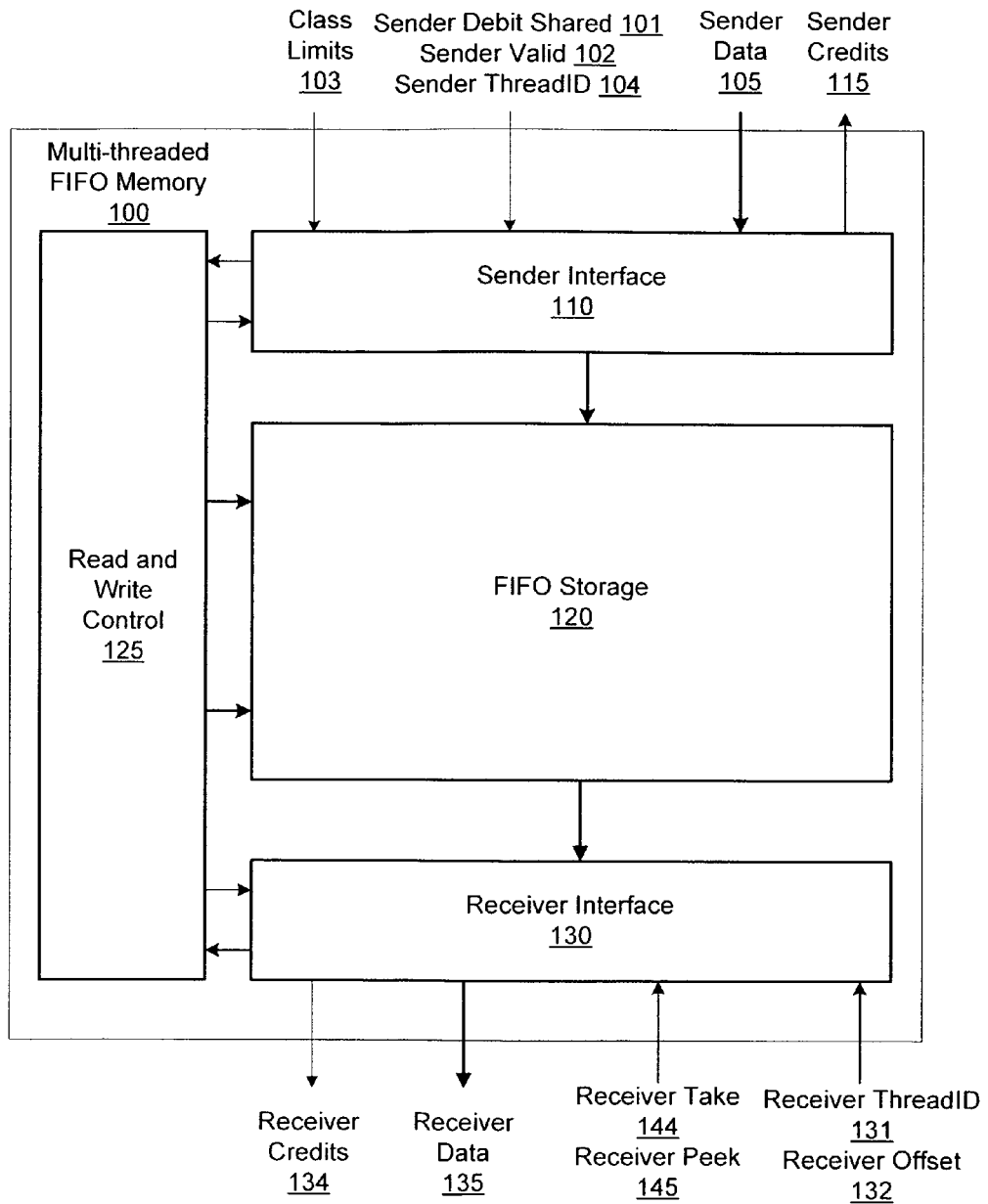
FIG. 1A illustrates a block diagram of a multi-threaded FIFO memory in accordance with one or more aspects of the present invention.

FIG. 1A illustrates a block diagram of a multi-threaded FIFO memory 100, in accordance with one or more aspects of the present invention. Multi-threaded FIFO memory 100 includes a sender interface 110, a read and write control 125, a FIFO storage 120, and a receiver interface 130. FIFO storage 120 may include flip flops, random access memory, or the like. Sender interface 110 issues sender credits via sender credits 115 and receives thread data from a sender via sender data 105 for storage in FIFO storage 120. Sender data may be received and stored for each sender credit that has been issued via sender credits 115. Sender credits 115 include a bit for each dedicated class and for the shared class. A dedicated class is allocated a number of entries in FIFO storage 120 that may only be used to store data for threads included in the dedicated class. A shared class is allocated a number of entries that may be used to store data for any thread. All threads are implicitly in the shared class.

The number of entries allocated to each class is specified by class limits 103. Class limits 103 may be changed for one or more classes while data is stored in FIFO storage 120. Programmable limits for each class may be specified using program instructions at the application level. Default limit values may be provided or values may be determined and programmed by a device driver during multi-threaded processing. In other embodiments of the present invention, the limit values may be hardwired. The combination of the number of credits issued for a class and the number of entries storing thread data included in the class should not exceed the credit limit defined for the class.

In addition to sender data 105, a sender also provides a shared class debit flag via sender debit shared 101, a threadID via sender threadID 104 and a valid signal via sender valid 102. The sender indicates that a shared class credit is used for sender data by asserting debit shared 101. When a dedicated class credit is used for sender data, debit shared 101 is negated. Each thread has a unique thread identifier, threadID. Threads are assigned to classes, with each class including one or more threads. The valid signal is asserted by the sender when sender data is provided for storage. For each clock cycle that a bit of sender credits 115 is asserted, the valid signal may be asserted to provide data and "use" a sender credit. Issuing sender credits ensures that the sender does not provide more data than can be stored in FIFO storage 120. Therefore, sender interface 110 must accept the data provided by the sender when the valid signal is asserted.

This protocol is particularly well-suited to transfer data between a sender and a multi-threaded FIFO memory 100 that are not adjacent on a die and may have one or more retiming flip-flops inserted between their connections to meet timing constraints, such as long haul signals. In other embodiments of the present invention, sender credits 115 may be replaced with a signal indicating whether or not data may be accepted during the current clock cycle.

Sender interface 110 outputs data for storage in FIFO storage 120 and outputs the threadID corresponding to the data and a push signal to read and write control 125. Sender interface 110 determines the number of sender credits output for each class based on the limit values, as described in conjunction with FIG. 2A. Sender interface 110 receives a pop signal and threadID from read and write control 125 when data corresponding to the threadID is popped from FIFO storage 120. Read and write control 125 generates read and write requests, including addresses (pointers to entries in FIFO storage 120), for output to FIFO storage 120, as described in conjunction with FIGS. 5A, 5B, 5C, and 5D.

Read and write control 125 outputs the threadID corresponding to the data provided to FIFO storage 120 by sender interface 110 and a push signal to receiver interface 130. Receiver interface 130 uses the threadID and push signal to generate receiver credits 124. For each assertion of the push signal, a bit of receiver credit corresponding to the threadID is asserted, indicating that data for the threadID is available in FIFO storage 120 and may be popped. When a take request is presented via receiver take 144, data for the thread corresponding to receiver threadID 131 is output to receiver data 135. Receiver interface 130 outputs a pop signal (corresponding to the take request), receiver threadID 131, receiver offset 132, and a receiver peek 145 signal to read and write control 125.

A peek request is presented via receiver peek 145 and is used to read data from FIFO storage 120 without removing (popping) the data from FIFO storage 120. After data is read by for a peek request, the data may be popped (read and removed from FIFO storage 120) by a take request. Receiver offset 132 is used to read data stored in an entry of a FIFO for a thread that is offset from the head of the FIFO. Rather than reading data at the top of the FIFO, i.e., the oldest data in the FIFO, data from other positions in the FIFO may be read by specifying a non-zero offset for receiver offset 132. Multi-threaded FIFO memory 100 also receives a reset signal and at least one clock signal. In some embodiments of the present invention, multi-threaded FIFO memory 100 is asynchronous and a first clock is provided by a sender to sender interface 110 and a second clock is provided by a receiver to receiver interface 130. When multiple receivers read data stored in multi-threaded FIFO memory 100, an arbiter may be coupled between the multiple receivers and multi-threaded FIFO memory 100. Likewise, when multiple senders provide data to multi-threaded FIFO memory 100, an arbiter may be coupled between the multiple senders and multi-threaded FIFO memory 100.

Figure 1B:
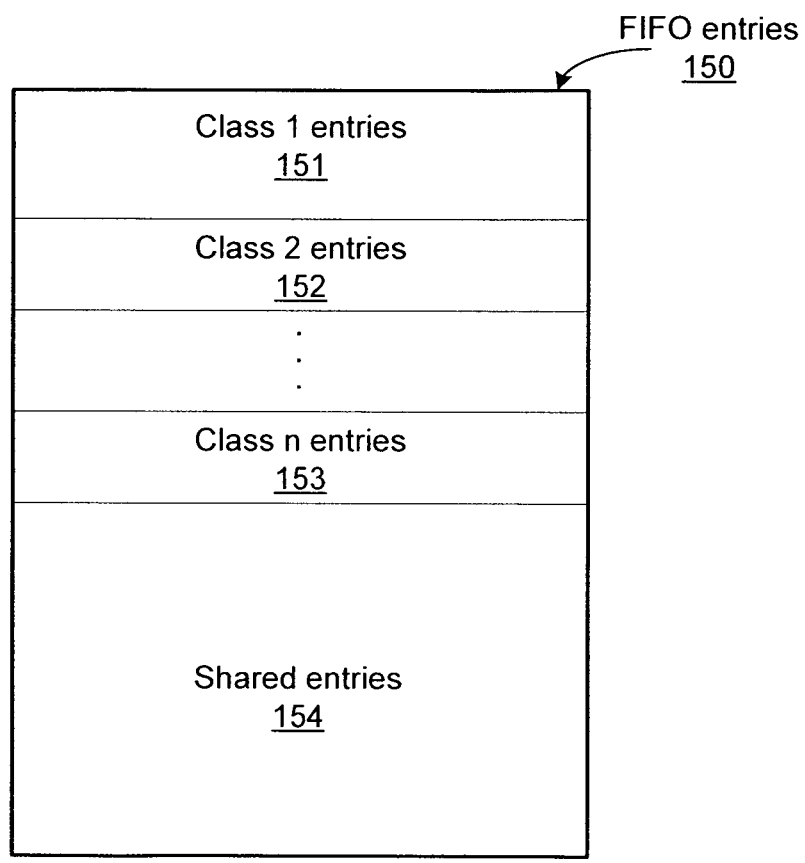
FIG. 1B illustrates a conceptual diagram of data entries in a multi-threaded FIFO memory in accordance with one or more aspects of the present invention.

FIG. 1B illustrates a conceptual diagram of data entries, FIFO entries 150, in FIFO storage 120 of multi-threaded FIFO memory 100, in accordance with one or more aspects of the present invention. In order to store data in each entry of FIFO storage 120, the number of entries allocated to the combination of the dedicated classes and shared class, i.e., the number of entries in FIFO entries 150, should be equal to the number of entries in FIFO storage 120. A limit value may be specified for each of class 1 entries 151, class 2 entries 152, class n entries 153, and shared entries 154. The sum of the limit values should not exceed the number of entries in FIFO storage 120.

As previously described, each class may include one or more threads, specified by their respective threadIDs. For example, class 1 entries 151 may be configured to store data for threadID 1 and threadID 2. Class 2 entries 152 may be configured to store data for threadID 3. Shared entries 152 may be configured to store data for threadID 4. Because shared entries 152 is a shared class, shared entries 152 may also store data for threadID 1, threadID 2, and threadID 3.

Figure 2A:
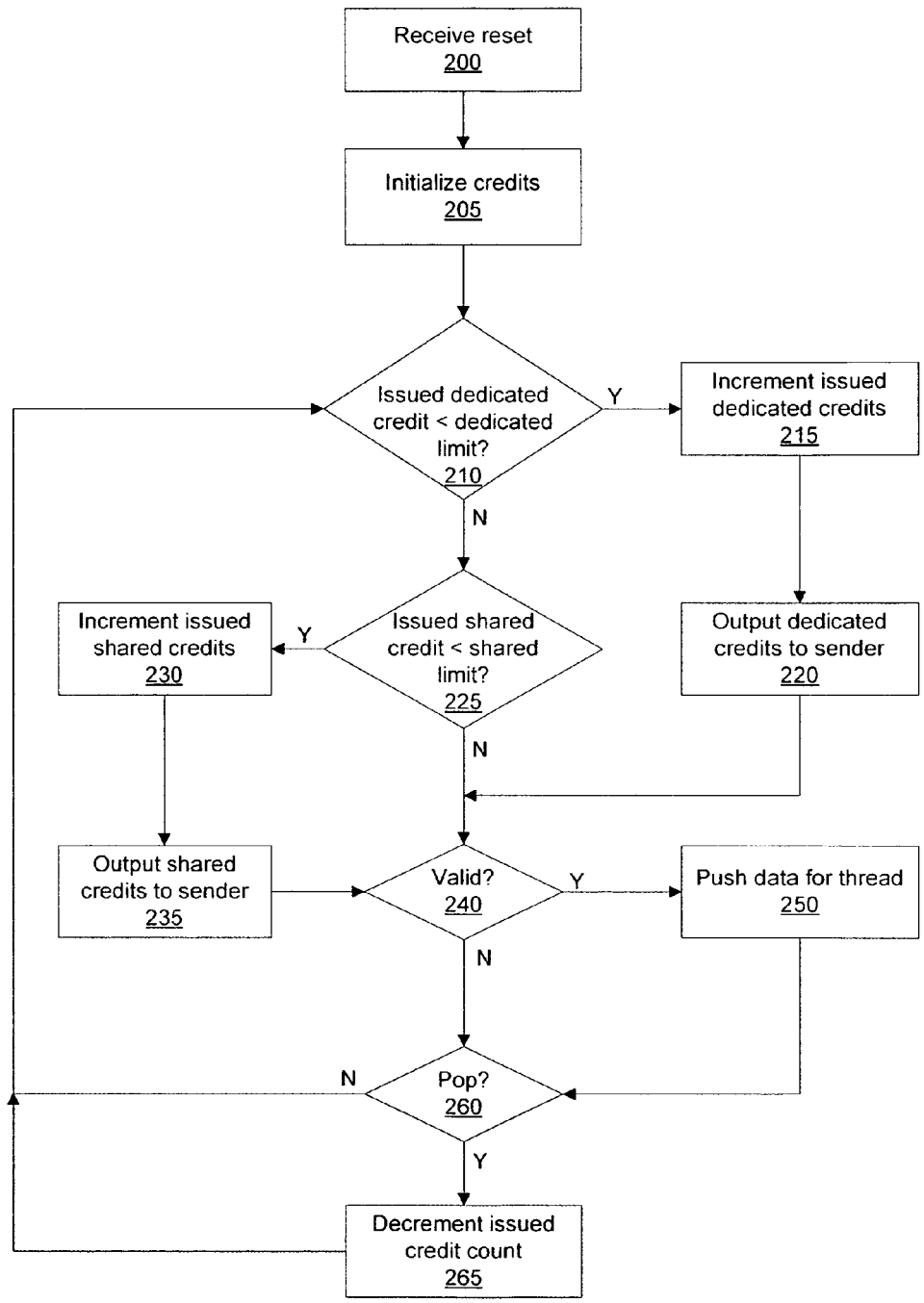
FIG. 2A illustrates a flow diagram of an exemplary method of tracking the status of entries in the multi-threaded FIFO memory of FIG. 1A in accordance with one or more aspects of the present invention.

FIG. 2A illustrates a flow diagram of an exemplary method of tracking the status of entries in FIFO storage 120, in accordance with one or more aspects of the present invention. In step 200 multi-threaded FIFO memory 100 receives a reset signal. In step 205 sender interface 110 initializes sender credits by issuing a predetermined number of credits for each class via sender credits 115. In one embodiment of the present invention, sender interface 110 issues one credit for each class. Therefore, a sender may begin providing data to multi-threaded FIFO memory 100 following reset and without waiting to receive a credit. This may improve the data processing throughput of a system including multi-threaded FIFO memory 100.

Sender interface 110 maintains a count of issued credits for each class, referred to as issued dedicated credit counts and an issued shared credit count. The issued credit counts are updated to indicate the number of credits issued for each class in step 205. In some embodiments of the present invention, sender interface 110 may also maintain a count of credits for which data is stored in FIFO storage 120, referred to as occupied dedicated credit counts and occupied shared credit count.

In those embodiments, a total dedicated credit count can be computed for a dedicated class by summing the occupied dedicated credit count and issued dedicated credit count for the dedicated class. Similarly, a total shared credit count can be computed for the shared class by summing the occupied shared credit count and issued shared credit count for the shared class. The total dedicated credit count for a dedicated class should not exceed the limit value for the dedicated class. Likewise, the total shared credit count for the shared class should not exceed the limit value for the shared class. In other embodiments of the present invention, the issued dedicated credit counts and issued shared credit count include the issued credits and the occupied credits and the issued credit counts are equal to the total credit counts.

In step 205 sender interface 110 may also receive limit values for each class via class limits 103 and store the limit values in registers. The limit values define the maximum number of dedicated credits available for each dedicated class and the maximum number of shared credits available for the shared class.

In step 210 sender interface 110 determines if the number of dedicated credits issued for any class is less than the maximum number of dedicated credits, i.e., dedicated limit, for the class. If, in step 210 sender interface 110 determines that one or more classes have dedicated credits that may be issued, in step 215 sender interface 110 increments the issued dedicated credit count for each of the one or more classes. Each issued dedicated credit count may be incremented by one or more depending on the number of sender credits that will be issued to the class. In some embodiments of the present invention, each issued dedicated credit count is incremented once per clock cycle. In other embodiments of the present invention, multiple credits may be issued in a single clock cycle and each issued dedicated credit count may be updated accordingly in a single clock cycle. In step 220 sender interface 110 issues sender credits to each of the one or more classes. Sender interface 110 may issue one sender credit to each of the one or more classes or sender interface 110 may issue more than one sender credit to each of the one or more classes.

If, in step 210 sender interface 110 determines that all of the classes have issued dedicated credit counts equal to their respective limit values, then in step 225 determines if the number of shared credits issued for any class (issued shared credit count) is less than the maximum number of shared credits. If, in step 225 sender interface 110 determines that shared credits are available for issue, then in step 230 sender interface 110 increments the issued shared credit count for the shared credit class. The issued shared credit count may be incremented by one or more depending on the number of shared credits that will be issued. In step 235 sender interface 110 issues shared credits to the shared class. Sender interface 110 may issue one shared credit or sender interface 110 may issue more than one shared credit.

In step 240 sender interface 110 determines if the sender valid signal is asserted, i.e., the sender is providing data to multi-threaded FIFO memory for storage. If, in step 240 the sender valid signal is not asserted, then sender interface 110 proceeds directly to step 260. If, in step 240 the sender valid signal is asserted, then in step 250 sender interface 110 asserts a push signal to read and write control 125 and outputs sender data 105 to FIFO storage 120. Sender interface 110 also outputs the sender threadID and the shared class debit flag to read and write control 125. A more detailed description of step 250 is provided in conjunction with FIG. 5A.

In step 260 sender interface 110 determines if a pop signal is received from read and write control 125, and, if not, sender interface 110 returns to step 210 to determine if more credits may be issued. Otherwise, in step 265 sender interface 110 decrements the issued credit count corresponding to the data that was popped from FIFO storage 120. After completing step 265, sender interface 110 returns to step 210 to determine if more credits may be issued. In other embodiments of the present invention, additional limit values, thresholds, and the like may be used to control the output of sender credits to a sender. Furthermore, varying techniques of allocating the shared credits between different dedicated classes may be used by the sender. For example, a priority may be specified for each class and the allocation of shared credits may be influenced by the priority of each class.

Figure 2B:
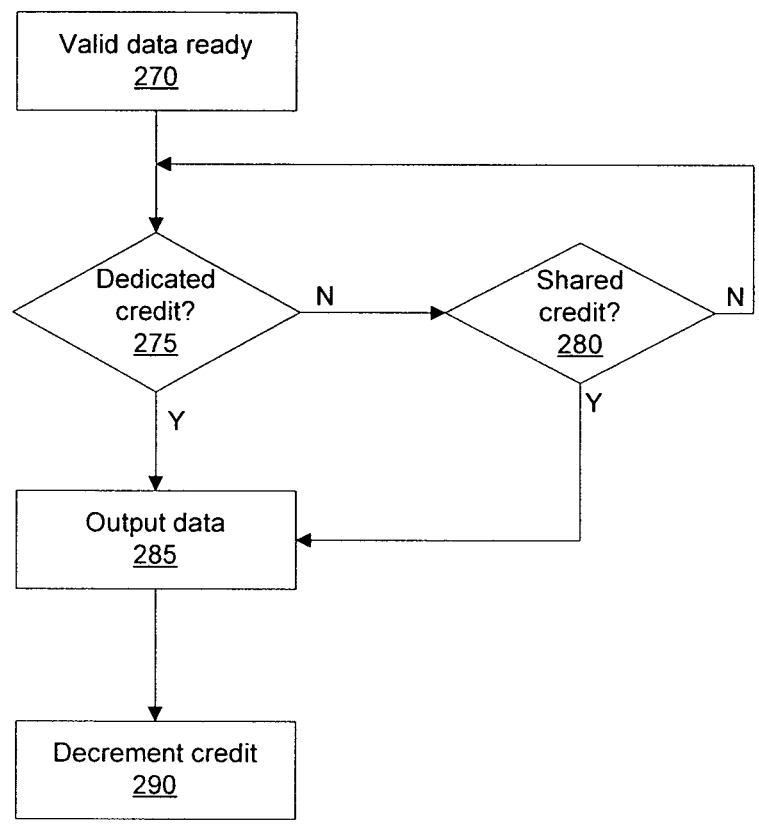
FIG. 2B illustrates a flow diagram of an exemplary method of providing data for storage in the multi-threaded FIFO memory of FIG. 1A in accordance with one or more aspects of the present invention.

FIG. 2B illustrates a flow diagram of an exemplary method of providing data for storage in FIFO storage 120, in accordance with one or more aspects of the present invention. The method steps shown in FIG. 2B may be performed by a sender providing data for storage in FIFO storage 120. In step 270 the sender determines that valid data is ready for output to multi-threaded FIFO memory 100. In step 275, the sender determines if a dedicated credit is available based on the class that includes the threadID and class of the dedicated credit. The sender maintains a count of dedicated credits received from sender interface 110 for each class. The sender also maintains a mapping of threadIDs to classes in order to determine whether an available credit may be used to send data for a particular threadID.

If, in step 275 the sender determines that a dedicated credit is available, then sender interface proceeds directly to step 285. Otherwise, in step 280 the sender determines if a shared credit is available, and, if not, the sender returns to step 275 and waits for a dedicated or shared credit to be issued. In step 285 the sender outputs data to multi-threaded FIFO memory 100 via sender data 105, for storage in FIFO storage 120. The sender also outputs the shared class debit flag, the sender valid signal, and the sender threadID, to sender interface 110. In step 290 the sender decrements the credit count, shared or dedicated, corresponding to the class that was output in step 285. In some embodiments of the present invention, the sender may use shared credits before using dedicated credits. In other embodiments of the present invention, the sender may rely on threadID or class priorities in determining whether to use a shared or dedicated credit to output data for a thread. In still other embodiments of the present invention, the sender may accumulate several sender credits and send data for a particular threadID over several consecutive cycles, i.e., a burst.

Figure 3A:
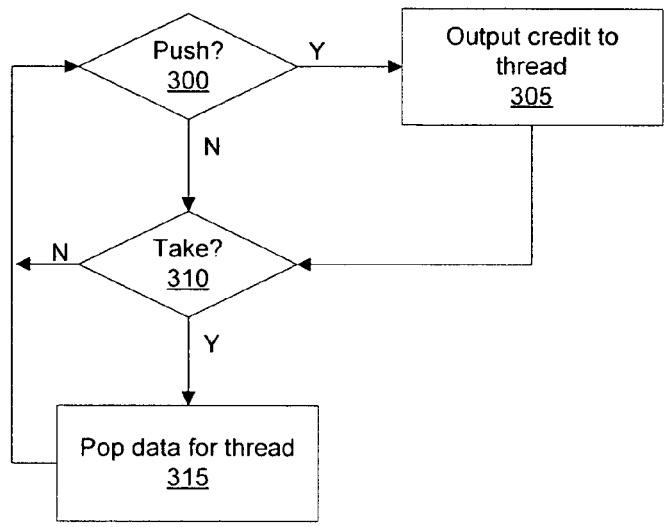
FIG. 3A illustrates a flow diagram of an exemplary method of performing the functions of the receiver interface of FIG. 1A in accordance with one or more aspects of the present invention.

FIG. 3A illustrates a flow diagram of an exemplary method of performing the functions of the receiver interface 130 of FIG. 1A in accordance with one or more aspects of the present invention. In step 300 receiver interface 130 determines if a push is received from read and write control 125, and, if not, receiver interface 130 proceeds directly to step 310. If, in step 300 receiver interface 130 determines that a push is received, then in step 305 receiver interface 130 outputs a receiver credit for the threadID. In addition to a push signal, receiver interface 130 receives a threadID from read and write control 125. Unlike sender interface 110, receiver interlace 130 issues credits for threadIDs rather than classes. Therefore, receiver interface 130 does not rely on the class to threadID mapping.

In step 310 receiver interface 130 determines if a take request is received from a receiver, and, if not, receiver interface 130 returns to step 300. A take request is received when receiver take 144 is asserted and the take request indicates that the receiver wants data that corresponds to the receiver threadID provided via receiver threadID 131 to be output via receiver data 135. When data is output using a take request, the data is not retained in FIFO storage 120, i.e., the entry in FIFO storage 120 that stored the data may be overwritten. If, in step 310 receiver interface 130 determines that a take request is received, then in step 315 receiver interface 130 pops data for the thread corresponding to the threadID and outputs the data. A more detailed description of step 315 is provided in conjunction with FIGS. 5B and 5C.

When an offset specified via receiver offset 132 is zero, the data is popped from FIFO storage 120 in FIFO order, i.e., the data that was written first is popped first for each thread. When the offset is not zero, the data is popped from FIFO storage 120 based on the offset. The offset corresponds to the entry in the FIFO for a thread, where an offset of zero indicates the head of the FIFO (first-in entry) and an offset of n, where n is the size of the FIFO indicates the tail of the FIFO (last-in entry).

Figure 3B:
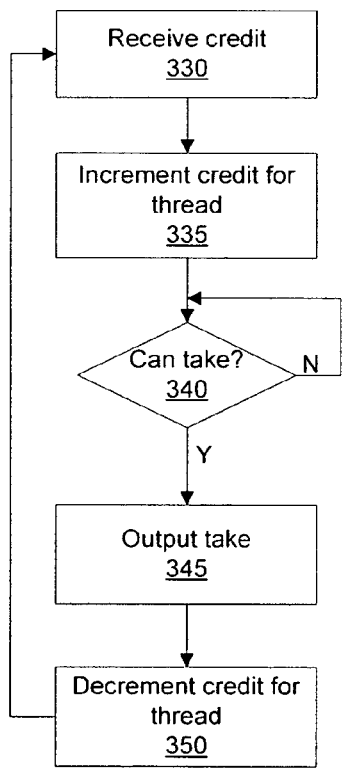
FIG. 3B illustrates a flow diagram of an exemplary method of obtaining data from the multi-threaded FIFO memory of FIG. 1A in accordance with one or more aspects of the present invention.

FIG. 3B illustrates a flow diagram of an exemplary method of obtaining data from multi-threaded FIFO memory 100 of FIG. 1A, in accordance with one or more aspects of the present invention. In step 330 a receiver receives one or more receiver credits from receiver interface 130 via receiver credits 134. Receiver interface 130 asserts a bit of receiver credits 134 that corresponds to a particular threadID to issue a receiver credit for that particular threadID. The receiver maintains a count of available receiver credits for each threadID. In step 335 the receiver increments an available receiver credit count corresponding to the threadID indicated by receiver credits 134. In some embodiments of the present invention, more than one receiver credit may be issued in a cycle and one or more available receiver credit counts are updated accordingly in step 335.

In step 340 the receiver determines if data may be accepted from multi-threaded FIFO memory 100 for any thread with an available receiver credit count greater than zero. If, in step 340 the receiver determines that data may be accepted for a thread, then in step 345 the receiver outputs a take request to multi-threaded FIFO memory 100 and outputs the threadID for the thread via receiver threadID 131. The receiver may also provide an offset indicating that an entry other than the head of a thread FIFO should be output. In step 350 the receiver decrements the available receiver credit count for the threadID. The receiver has the flexibility to determine when to take data from multi-threaded FIFO memory 100 for any one of the threads. Therefore, each of the threads may be processed independently from the other threads. Specifically, each thread may be processed as though a separate FIFO is used to store data for each thread.

Figure 3C:
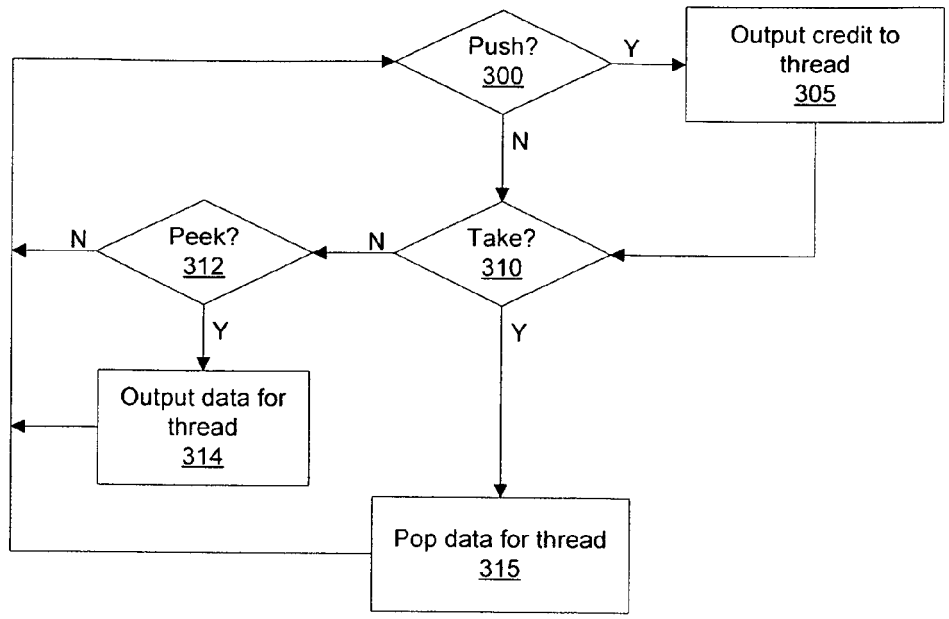
FIG. 3C illustrates a flow diagram of another exemplary method of performing the functions of the receiver interface of FIG. 1A in accordance with one or more aspects of the present invention.

FIG. 3C illustrates a flow diagram of another exemplary method of performing the functions of receiver interface 130 of FIG. 1A, including processing a peek request, in accordance with one or more aspects of the present invention. The flow diagram of FIG. 3C includes steps 300, 305, 310, and 315 of FIG. 3A. Steps 300 and 305 are performed as previously described in conjunction with FIG. 3A. In step 310 receiver interface 130 determines if a take request is received from a receiver, and, if so, receiver interface 130 proceeds to step 315 and pops data for the thread corresponding to the threadID received via threadID 131 and outputs the data. Otherwise, in step 312, receiver interface 130 determines if a peek request is received from the receiver, and, if not, receiver interface 130 returns to step 300.

A peek request is received when receiver peek 145 is asserted and the peek request indicates that the receiver wants data that corresponds to the threadID specified by receiver threadID 131 to be output via receiver data 135 and retained in FIFO storage 120. Therefore, data that is output using a peek request may be output at a later time using either a peek request or a take request. If, in step 312 receiver interface 130 determines that a peek request is received from the receiver, then in step 314 data for the thread that corresponds to the threadID provided via receiver threadID 131 with the peek request is output via receiver data 135. A more detailed description of step 314 is provided in conjunction with FIG. 5D.

Figure 3D:
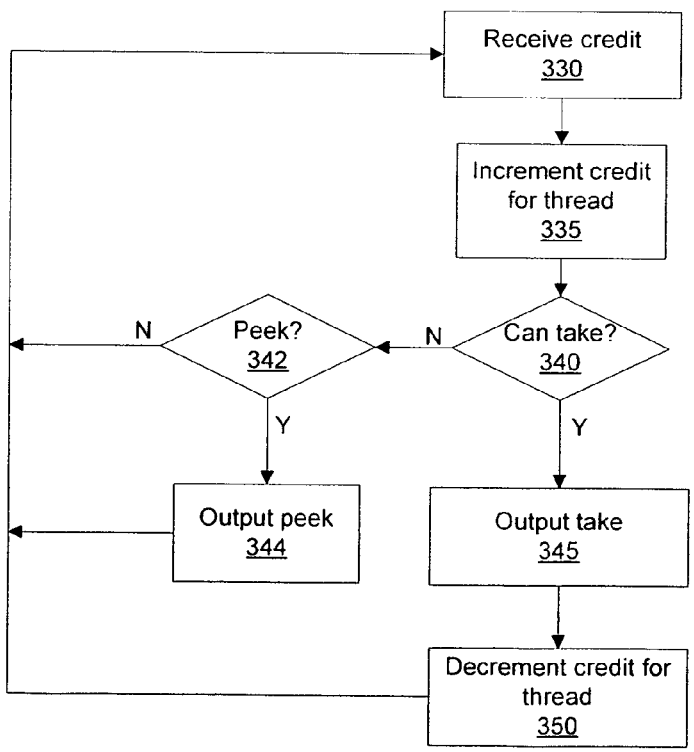
FIG. 3D illustrates a flow diagram of another exemplary method of obtaining data from the multi-threaded FIFO memory of FIG. 1A in accordance with one or more aspects of the present invention.

FIG. 3D illustrates a flow diagram of another exemplary method of obtaining data from multi-threaded FIFO memory 100 of FIG. 1A, including generating a peek request, in accordance with one or more aspects of the present invention. The flow diagram of FIG. 3D includes steps 330, 335, 340, 345, and 350 of FIG. 3B. Steps 330, 335, 345, and 350 are performed as previously described in conjunction with FIG. 3B. In step 340 the receiver determines if data may be accepted from multi-threaded FIFO memory 100 for any thread with an available receiver credit count greater than zero. If, in step 340 the receiver determines that data may be accepted for a thread, then the receiver proceeds to step 345. Otherwise, in step 342, the receiver determines if data should be read (peeked) from multi-threaded FIFO memory 100 for any thread with an available receiver credit count greater than zero. If, in step 342 the receiver determines that a peek should not be issued, the receiver returns to step 330. Otherwise, in step 344 the receiver outputs a peek request to multi-threaded FIFO memory 100 and outputs the threadID for the thread via receiver threadID 131. The receiver may also provide an offset indicating that an entry other than the head of a thread FIFO should be read.

Figure 4A:
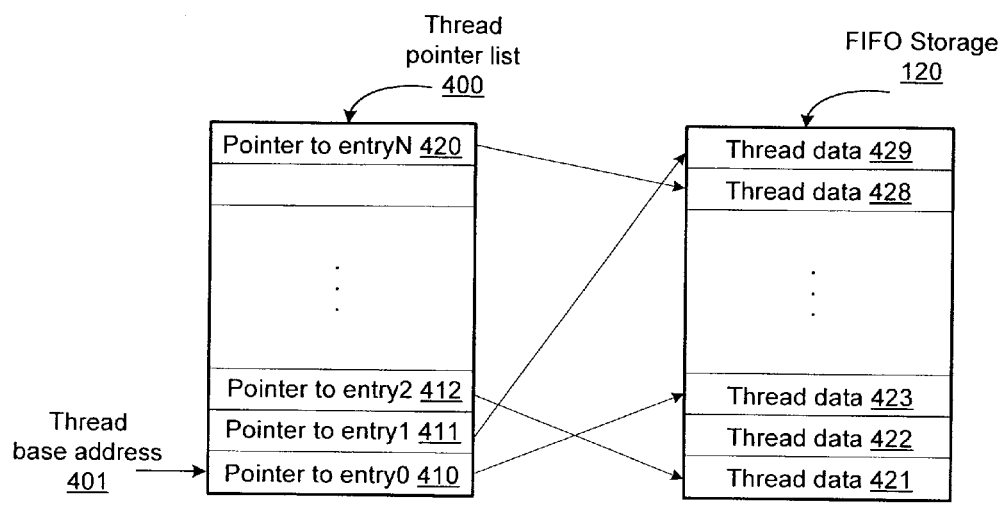
FIG. 4A illustrates a conceptual diagram a thread pointer list and the FIFO storage in accordance with one or more aspects of the present invention.

FIG. 4A illustrates a conceptual diagram of a thread pointer list, thread pointer list 400, and FIFO storage 120 in accordance with one or more aspects of the present invention. Thread pointer list 400 is included within read and write control 125 and may include flip-flops, RAM, or the like. Thread pointer list 400 includes an entry for each entry in FIFO storage 120 that stores data for a particular thread and is used to configure FIFO storage 120 as a FIFO storing the data for the particular thread.

Because FIFO storage 120 stores data for multiple execution threads that push and pop data at different rates, each entry in FIFO storage 120 may store data for any one of the execution threads as the entry becomes available. Therefore, data for a single thread may be scattered within various locations in FIFO storage 120. To emulate a FIFO for a single thread, an ordered list of pointers for the single thread is maintained using thread pointer list 400. Thread base address 401 indicates the head of the FIFO that stores pointer to entry0 410. Pointer to entry0 410 corresponds to the entry in FIFO storage 120 that stores thread data 429, the first-in data for the thread. The next entry in the FIFO, thread data 429, is stored at the entry in FIFO storage 120 corresponding to pointer to entry1 411. Pointer to entry1 411 is stored in the second entry of thread pointer list 400, the entry offset by 1 from thread base address 401.

The pointers stored in thread pointer list 400 are stored in FIFO order, the order in which data stored in the entry of FIFO storage 120 corresponding to the pointers was stored. For example, a third entry in the FIFO, the entry offset by 2 from thread base address 401, stores pointer to entry2 412 that corresponds to the entry in FIFO storage 120 that stores thread data 421. The tail of the FIFO stores pointer to entryN 420, the entry offset by N from thread base address 401, where N is the number of occupied entries in the FIFO. Pointer to entryN 420 corresponds to the entry in FIFO storage 120 that stores thread data 428. Thread data 422 may be thread data for another thread or thread data that may be overwritten because a pointer corresponding to the entry storing thread data 422 is not stored in thread pointer list 400 or another thread pointer list.

As thread data is popped from FIFO storage 120, thread base address 401 is updated to point to the entry storing pointer to entry1 411, the entry storing pointer to entry2 412, and so forth. Alternatively, each pointer may be copied, i.e., shifted, to the adjacent entry in thread pointer list 400. For example, when pointer to entry0 410 is popped, pointer to entry1 411 may be copied to the entry corresponding to thread base address 401 and pointer to entry2 412 may be copied to the entry at an offset of 1. Shifting the pointers in thread pointer list 400 may be more efficient than shifting the thread data stored in FIFO storage 120 since the pointers are typically fewer bits than the thread data. When data for multiple execution threads is stored in FIFO storage 120, a thread pointer list is needed for each one of the multiple execution threads, as shown in FIG. 4B.

Figure 4B:
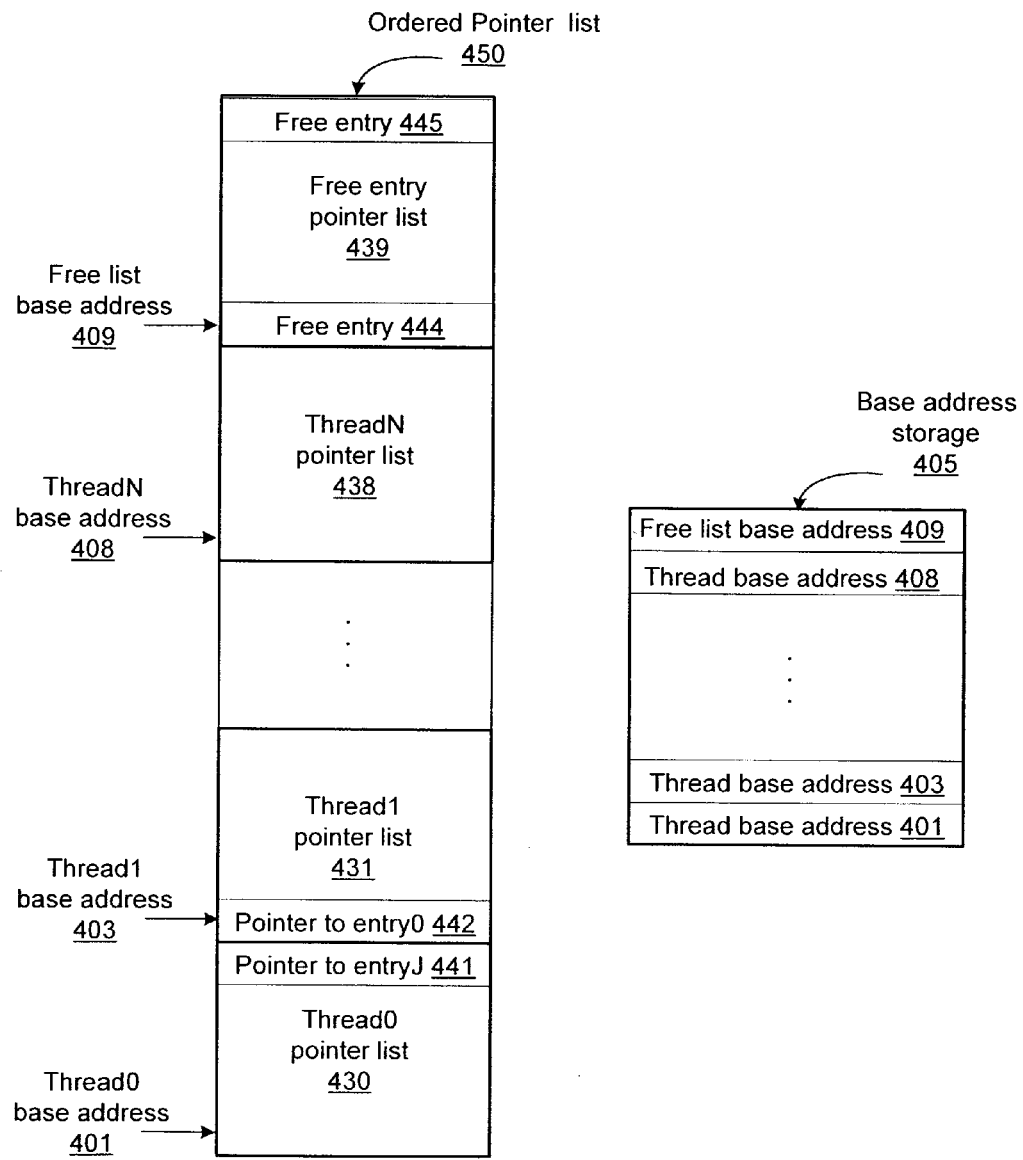
FIG. 4B illustrates a conceptual diagram of a base address storage and an ordered pointer list that includes a free entry pointer list and several thread pointer lists in accordance with one or more aspects of the present invention.

FIG. 4B illustrates a conceptual diagram of a base address storage, base address storage 405, and an ordered pointer list, ordered pointer list 450, that includes a free entry pointer list and several thread pointer lists, in accordance with one or more aspects of the present invention. Ordered pointer list 450 includes thread pointer lists for two or more execution threads and a free entry pointer list 439 that stores pointers to entries in FIFO storage 120 that are available to store data. Because ordered pointer list 450 includes two or more ordered pointer lists, a mechanism for locating the ordered pointer list for each thread should be provided. As previously described, a thread pointer list forms the data FIFO for an execution thread. The head of the data FIFO for a thread may be located using the base address for the thread. The tail of the data FIFO for the thread may be located by subtracting 1 from the base address of the next thread. For the last thread, the tail may be located by subtracting 1 from the base address of free entry pointer list 439, free list base address 409. In other embodiments of the present invention, addresses for the tail locations may be stored or the addresses for the tail locations may be computed using the size of each data FIFO. The size of each data FIFO is easily determined by tracking the pushes and pops for each threadID.

Base address storage 405 includes an entry for a thread base address of each one of the thread pointer lists and an entry for a base address of a free list, free list base address 409. For example, thread0 base address 401 is stored in a first entry of base address storage 405, thread1 base address 403 is stored in a second entry of base address storage 405, threadN base address 408 is stored in an N+1 entry of base address storage 405, and free list base address 409 is stored in the last entry of base address storage 405. A FIFO for a particular threadID is empty when the base address for the threadID is equal to the base address for the threadID+1. In embodiments of the present invention that track the head and tail of the FIFO for each threadID, a FIFO is empty when the head is equal to the tail.

Upon reset, all of the entries in ordered pointer list 450 are included in free entry pointer list 439. As thread data is pushed into multi-threaded FIFO memory 100, free entries are moved from free entry pointer list 439 to the thread pointer lists. For example, when data is pushed into FIFO storage 120 of multi-threaded FIFO memory 100 for thread0, a pointer stored in the tail of free entry pointer list 439, free entry 445, is moved to the tail of thread0 pointer list 430, and is stored as pointer to entryJ 441. Alternatively, free entry 444 may be moved to the tail of thread° pointer list 430 and stored as pointer to entryJ 441. When an entry is moved within ordered pointer list 450, one or more base addresses may need to be changed. For example, when data is pushed into the FIFO for thread0, thread1 base address 403 is changed, i.e., incremented, to point to the entry storing pointer to entry0 442 within thread1 pointer list 431. Likewise, threadN base address 408 and free list base address 409 are also changed.

When an entry is moved from free entry pointer list to a thread pointer list, e.g., thread0 pointer list 430, thread1 pointer list 431, or threadN pointer list 438, entries "above" the moved entry are shifted up, so that each entry of ordered pointer list 450 is occupied and each entry within a thread pointer list remains in FIFO order. The entries are shifted up to absorb the removed entry in free entry pointer list 439, e.g., free entry 445. Note, that the order of the entries in free entry pointer list 439 is arbitrary. Therefore, any entry in free entry pointer list 439 may be moved when thread data is pushed. Similarly, an entry freed when thread data is popped may be inserted into any position within free entry pointer list 439.

When data is popped from FIFO storage 120 of multi-threaded FIFO memory 100 for thread1, a pointer stored in the head of thread1 pointer list 431, specifically at thread1 base address 403, is moved from thread1 pointer list 431 to free entry pointer list 439. Pointer to entry0 442 may be moved to the head or tail of free entry pointer list 439. When an entry in a thread FIFO is popped, and the corresponding pointer the entry is popped from a thread pointer list, such as pointer to entry0 442, entries "above" the popped pointer are shifted down, so that each entry of ordered pointer list 450 is occupied. Then the popped pointer may be moved to an entry in free entry pointer list. As previously explained with regard to pushing data, when data is popped one or more base addresses may need to be updated, e.g. decremented.

When a multi-ported memory is used for FIFO storage 120, a pop and push may occur simultaneously. Therefore, in addition to moving a first pointer from free entry pointer list 439 to a thread pointer list, a second pointer may be moved from the thread pointer list or another thread pointer list to free entry pointer list 439. When data is pushed and popped from a one thread FIFO and one thread pointer list, the base addresses are not changed and only entries within the thread pointer list are shifted. Otherwise, some entries in ordered pointer list 450 may be shifted up while other entries in ordered pointer list 450 are shifted down.

Figure 4C:
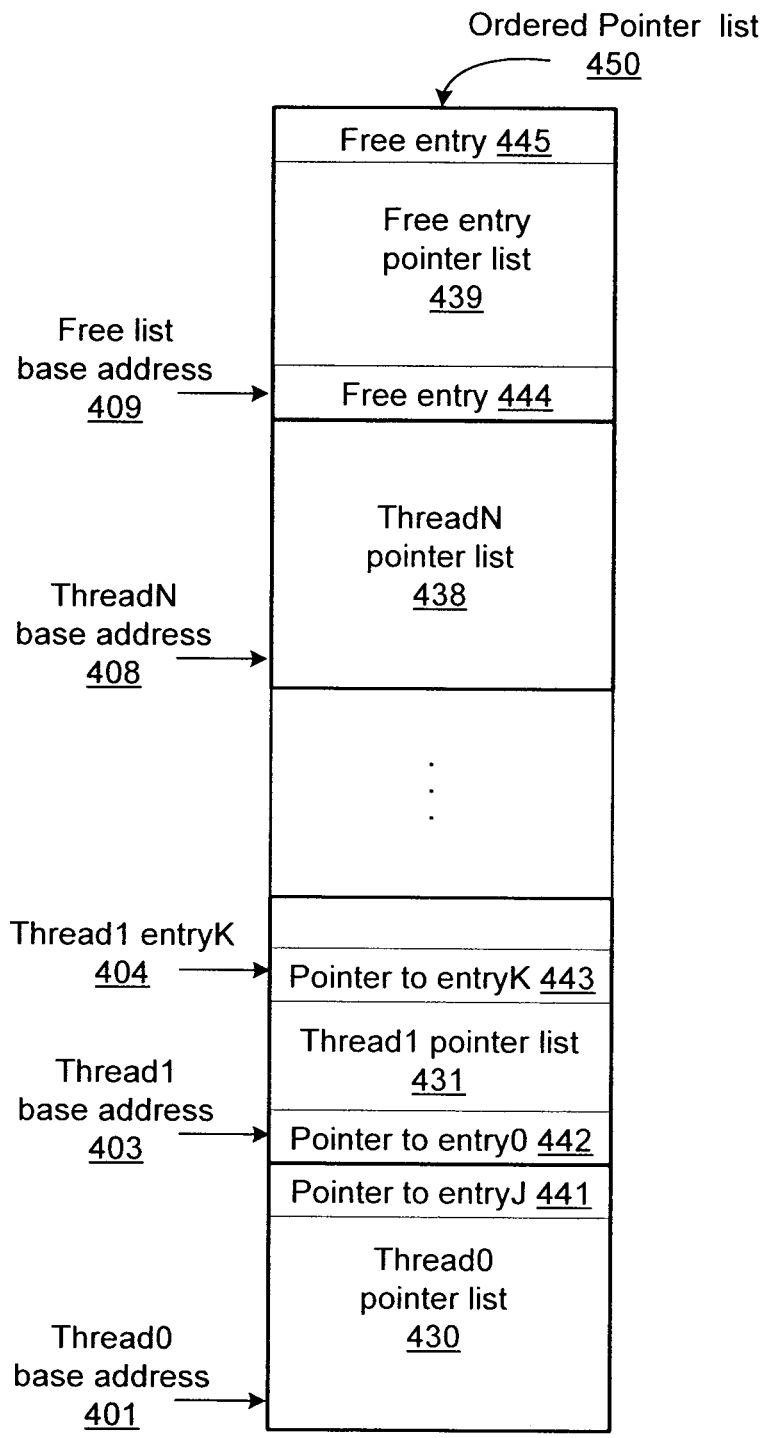
FIG. 4C illustrates another conceptual diagram of the ordered pointer list in accordance with one or more aspects of the present invention.

FIG. 4C illustrates another conceptual diagram of ordered pointer list 450 in accordance with one or more aspects of the present invention. When data for a thread is popped using a take or peek request, the data is read and output from the head of the data FIFO for the thread, unless a non-zero offset is provided with the take request. When a non-zero offset is provided the data is read and output from the entry in the data FIFO corresponding to a sum of the base address for the thread and the offset. For example, when a take or peek request for thread1 is received by multi-threaded FIFO memory 100 with an offset, the offset is summed with thread1 base address 403 to produce thread1 entryK 404. Thread1 entryK 404 corresponds to the entry of thread1 pointer list 431, i.e, the K+1 entry in the thread1 FIFO, that stores pointer to entryK 443. When the data stored in the entry of FIFO storage 120 corresponding to pointer to entryK 443 is requested using a take, pointer to entryK 443 is moved from thread1 pointer list 431 to free entry pointer list 439.

Figure 5A:
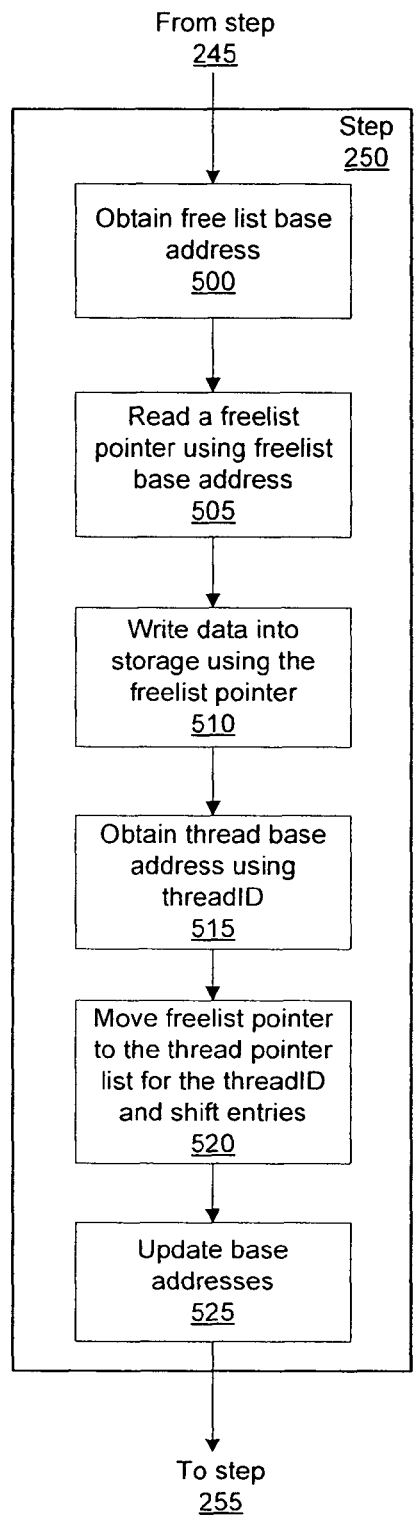
FIG. 5A illustrates a flow diagram of an exemplary method of performing step 250 shown in FIG. 2A in accordance with one or more aspects of the present invention.

FIG. 5A illustrates a flow diagram of an exemplary method of performing step 250 shown in FIG. 2A in accordance with one or more aspects of the present invention. In step 250 thread data is pushed into multi-threaded FIFO memory 100. In step 500, read and write control 125 obtains free list base address 409 from base address storage 405. In step 505 read and write control 125 reads a free list pointer from free entry pointer list 439. The free list pointer may be read from the head entry of free entry pointer list 439 using free list base address 409 or from another entry within free entry pointer list 439. In step 510 read and write control 125 writes the thread data to the entry in FIFO storage 120 that corresponds to the free list pointer.

In step 515 read and write control 125 obtains the thread base address for the threadID included with the thread data that was pushed. The thread base address is read from base address storage 405. In step 520 the free list pointer is moved from free entry pointer list 439 to the thread pointer list that corresponds to the threadID by storing the free list pointer in the entry of ordered pointer list corresponding to the thread base address for the threadID+1. The entry storing the free list pointer becomes the tail of the thread FIFO for the threadID. In step 520 read and write control 125 shifts entries in ordered pointer list 450 as needed to move the free list pointer to the thread pointer list.

In step 525 read and write control 125 updates the base addresses, one or more thread base addresses, and/or free list base address 409, as needed. For example, the thread base address for threadID+1 is updated by incrementing the thread base address to accommodate the pushed entry in the thread pointer list for threadID. Likewise, free list base address 409 is also incremented since an entry in free entry pointer list 439 was removed.

Figure 5B:
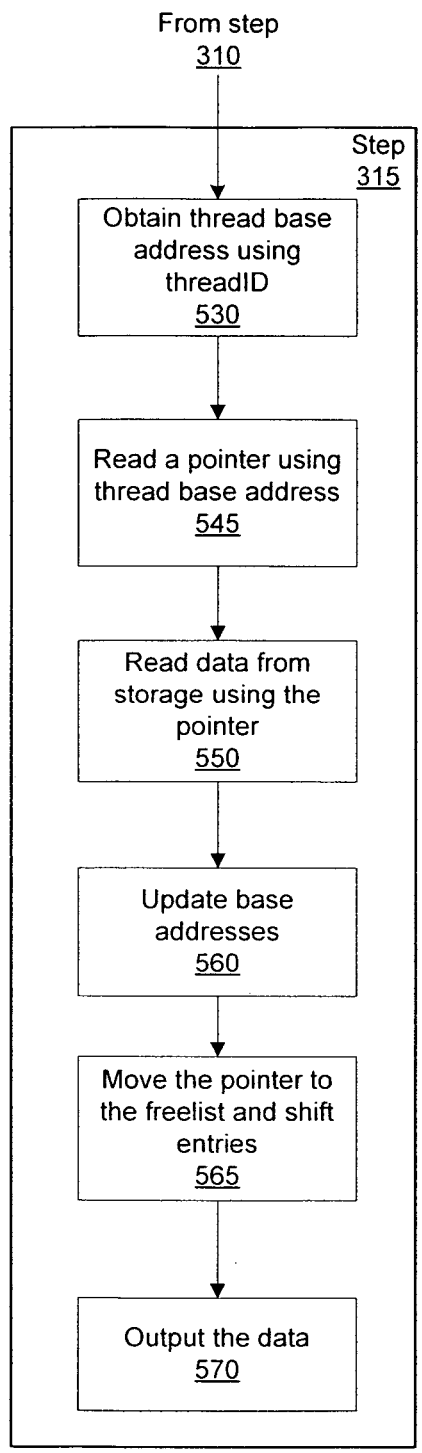
FIG. 5B illustrates a flow diagram of an exemplary method of performing step 315 shown in FIGS. 3A and 3C in accordance with one or more aspects of the present invention.

FIG. 5B illustrates a flow diagram of an exemplary method of performing step 315 shown in FIGS. 3A and 3C in accordance with one or more aspects of the present invention. In step 315 thread data is popped from FIFO storage 120 in response to a take request. In this embodiment of the present invention, an offset is not provided by the receiver with the take request.

In step 530 read and write control 125 obtains the thread base address for the threadID included with the take request. The thread base address is read from base address storage 405. In step 545 the pointer corresponding to the first entry in FIFO storage 120 (the head of the FIFO) for the threadID is read from the entry of the pointer list within ordered pointer list 450 that corresponds to the thread base address. In step 550 the thread data is read the entry in FIFO storage 120 that corresponds to the pointer.

In step 560 read and write control 125 updates the base addresses, one or more thread base addresses and/or free list base address 409, as needed. For example, the thread base address for threadID+1 is updated by decrementing the thread base address to accommodate the popped entry in the thread pointer list for threadID. Likewise, free list base address 409 is also decremented since an entry will be inserted in free entry pointer list 439. In step 565 the pointer is moved from the thread pointer list that corresponds to the threadID to free entry pointer list 439. In step 570 the thread data is output to the receiver via receiver interface 130. In step 565 read and write control 125 also shifts entries in ordered pointer list 450 as needed to move the pointer to free entry pointer list 439.

Figure 5C:
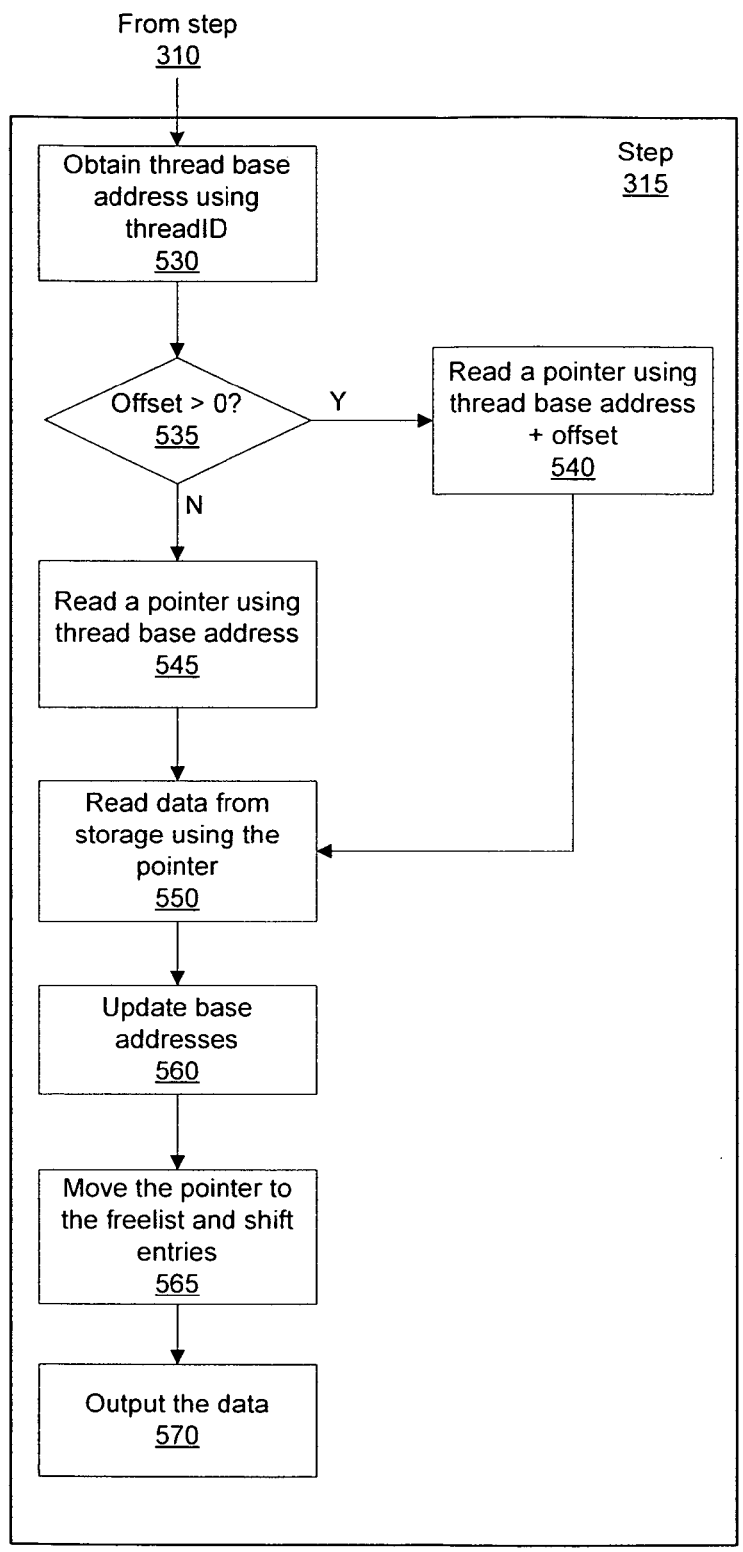
FIG. 5C illustrates a flow diagram of an exemplary method of performing step 315 shown in FIGS. 3A and 3C in accordance with one or more aspects of the present invention.

FIG. 5C illustrates a flow diagram of another exemplary method of performing step 315 shown in FIGS. 3A and 3C in accordance with one or more aspects of the present invention. In this embodiment of the present invention, an offset may be provided by the receiver with the take request.

Step 530 is completed as previously described to obtain the thread base address for the threadID included with the take request. In step 535 read and write control 125 determines if a non-zero offset is provided with the take request, and, if not, read and write control 125 proceeds to complete steps 545, 550, 560, 565, and 570 as previously described in conjunction with FIG. 5B. Otherwise, in step 540 the pointer corresponding to the entry in FIFO storage 120 for the threadID is read from the entry of the thread pointer list within ordered pointer list 450 that corresponds to the sum of the thread base address and offset. Steps 545, 550, 560, 565, and 570 are completed as previously described in conjunction with FIG. 5B.

Figure 5D:
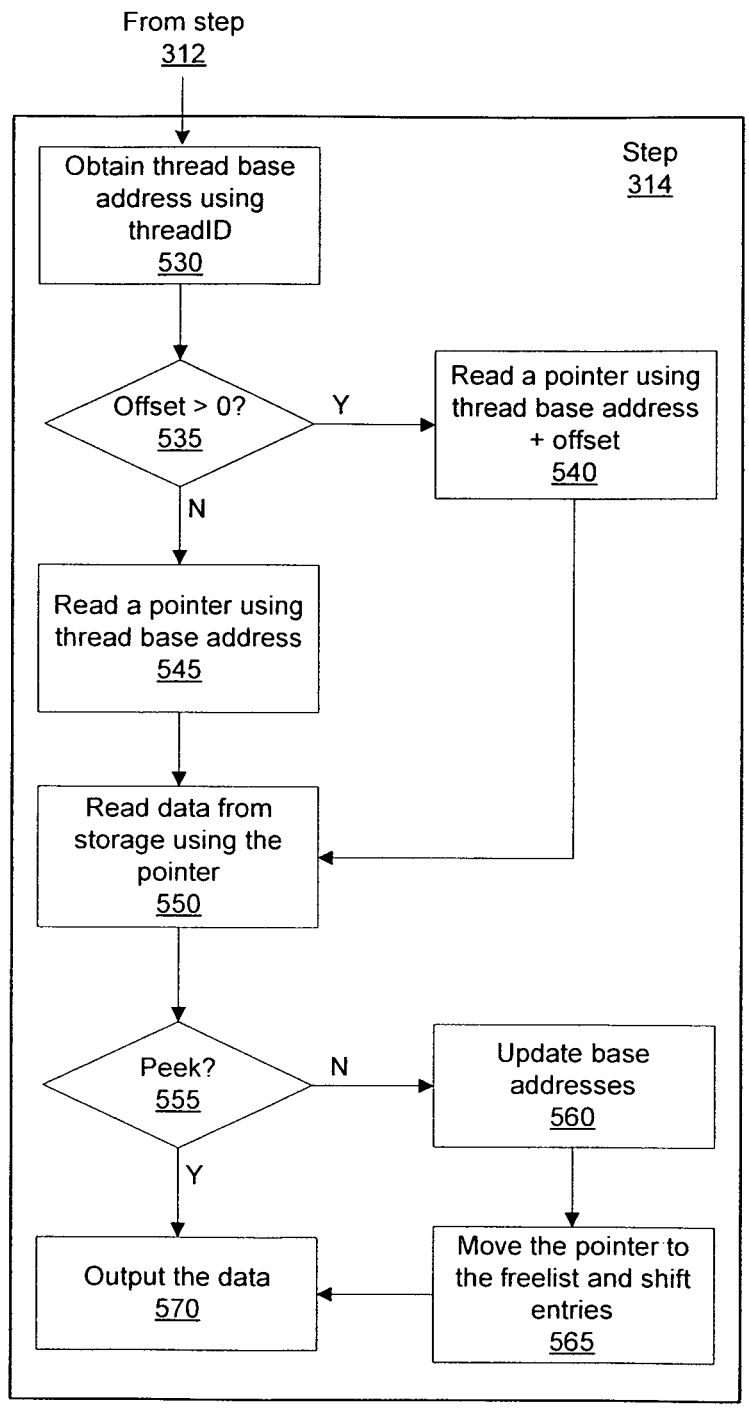
FIG. 5D illustrates a flow diagram of an exemplary method of performing step 314 shown in FIG. 3C in accordance with one or more aspects of the present invention.

FIG. 5D illustrates a flow diagram of an exemplary method of performing step 314 shown in FIG. 3C in accordance with one or more aspects of the present invention. In this embodiment of the present invention, an offset may be provided by the receiver with a take request or a peek request.

Steps 530, 535, 540, 545, and 550 are completed as previously described to read data from FIFO storage 120 for the threadID included with the take or peek request. In step 555 read and write control 125 determines if the request is a peek request, and, if not, read and write control 125 proceeds to complete steps 560, 565, and 570 as previously described in conjunction with FIG. 5B. Otherwise, read and write control 125 proceeds directly to step 570 and outputs the thread data without moving any pointers in ordered pointer list 450.

The current invention involves new systems and methods for storing data for multi-threaded processing. Instead of using a separate FIFO memory to store data for each thread, a single memory, FIFO storage 120, is used to store data for multiple threads. The single memory is shared between the threads to conserve die area, however each thread may be executed independently, as if each thread has a dedicated FIFO memory. An ordered list of pointers for each thread is maintained to emulate a FIFO for the multiple execution threads. Persons skilled in the art will appreciate that any system configured to perform the method steps of FIG. 2A, 2B, 3A, 3B, 3C, 3D, 3E, 5A, 5B, 5C, or 5D, or their equivalents, is within the scope of the present invention.

While the foregoing is directed to embodiments of the present invention, other and further embodiments of the invention may be devised without departing from the basic scope thereof, and the scope thereof is determined by the claims that follow. The foregoing description and drawings are, accordingly, to be regarded in an illustrative rather than a restrictive sense. The listing of steps in method claims do not imply performing the steps in any particular order, unless explicitly stated in the claim.

All trademarks are the respective property of their owners.

The invention claimed is:

1. A method of storing data for a plurality of threads in a FIFO (first-in first-out memory) storage, the method comprising:
    determining whether an issued credit count for a dedicated class of threads is less than a first limit value;
    if the issued credit count is less than the first limit value, then issuing a sender credit for the dedicated class of threads to a sender indicating that an entry is available in the FIFO storage for data that is to be processed by a thread included in the dedicated class of threads;
    if the issued credit count is not less than the first limit value, then issuing a sender credit for a shared class of threads to the sender indicating that an entry is available in the FIFO storage for data that is to be processed by a thread included in the shared class of threads, wherein a first number of entries in the FIFO storage are allocated to the shared class of threads that includes the plurality of threads, and a second number of entries in the FIFO storage are allocated to the dedicated class of threads, wherein the dedicated class of threads includes only a portion of the plurality of threads;
    receiving first data from the sender;
    obtaining a pointer to an entry in the FIFO storage from a free pointer list that includes pointers to available entries in the FIFO storage;
    storing the first data in the entry in the FIFO storage;
    storing the pointer in an ordered list of pointers; and
    outputting a receiver credit to a receiver indicating that the first data for the first thread is stored in the FIFO storage.

2. The method of claim 1, further comprising determining whether an issued credit count for the shared class of threads is less than a second limit value.

3. The method of claim 1, wherein a first thread is included within the dedicated class of the plurality of threads, and a sender credit for the shared class of threads is used for data for the first thread.

4. The method of claim 1, further comprising:
    receiving a request from the receiver for the first data;
    obtaining the pointer from the ordered list of pointers;
    reading the first data from the entry in the FIFO storage using the pointer;
    storing the pointer in the free pointer list; and
    outputting the first data to the receiver.

5. The method of claim 4, further comprising receiving an offset from the receiver; and summing the offset with a base address of the ordered list of pointers to obtain the pointer.

6. The method of claim 1, further comprising:
    receiving a peek request from the receiver for the first data;
    obtaining the pointer from the ordered list of pointers;
    reading the first data from the entry in the FIFO storage using the pointer; and
    outputting the first data to the receiver without removing the first data from the entry in the FIFO storage.

7. The method of claim 1, further comprising:
    receiving a reset signal; and
    initializing sender credits by issuing one sender credit to the shared class and one sender credit to the dedicated class in response to the reset signal.

8. A system for storing data for a plurality of threads, comprising:
    a sender interface configured to receive data that is to be processed by the plurality of threads and further configured to output a receiver credit to a receiver indicating that the data is stored in the FIFO storage;
    a FIFO (first-in first-out memory) storage coupled to the sender interface and configured to store the data, wherein a first number of entries in the FIFO storage are allocated to a shared class of threads that includes the plurality of threads and a second number of entries in the FIFO storage are allocated to a dedicated class of threads that includes only a portion of the plurality of threads, wherein the sender interface is configured to:
        determine whether an issued credit count for the dedicated class of threads is less than a first limit value;
        if the issued credit count is less than the first limit value, then issue a sender credit for the dedicated class of threads to a sender indicating that an entry is available in the FIFO storage for data that is to be processed by a thread included in the dedicated class of threads;
        if the issued credit count is not less than the first limit value, issue a sender credit for the shared class of threads to the sender indicating that an entry is available in the FIFO storage for data that is to be processed by a thread included in the shared class of threads;
    a receiver interface coupled to the FIFO storage and configured to output the data from the FIFO storage; and
    a read and write control unit configured to maintain an ordered pointer list and coupled to the FIFO storage, the ordered pointer list including free pointers corresponding to entries in the FIFO storage that are available to store the data in a first portion and pointers corresponding to entries in the FIFO storage that are not available in a second portion.

9. The system of claim 8, wherein the second portion includes a set of pointers for a first thread included in the plurality of threads and the pointers for the first thread are stored in consecutive adjacent entries within the second portion in an order that the pointers are used to write the data for the first thread in the FIFO storage.

10. The system of claim 8, wherein the ordered pointer list is configured to move a first pointer from the first portion to the second portion when data for an execution thread is written to an entry in the FIFO storage corresponding to the first pointer.

11. The system of claim 10, wherein the ordered pointer list is configured to shift one or more of the pointers in the second portion when the first pointer is moved from the first portion to the second portion.

12. The system of claim 8, wherein the ordered pointer list is configured to move a first pointer from the second portion to the first portion when data for an execution thread is output from an entry in the FIFO storage corresponding to the first pointer.

13. The system of claim 8, further comprising a base address storage configured to store one base address for an entry in the first portion of the ordered pointer list and to store additional base addresses for entries in the second portion of the ordered pointer list, wherein each one of the additional base addresses corresponds to a set of pointers for one of the plurality of threads.

14. The system of claim 13, wherein the receiver interface is configured to receive an offset that is summed with one of the additional base addresses to obtain a pointer from the ordered pointer list.

15. The system of claim 8, wherein a first thread included in the plurality of threads is assigned to the dedicated class and a sender credit for the shared class is used to store data for the first thread.

16. The system of claim 8, wherein the receiver interface is configured to issue receiver credits that indicate a number of entries that store data for each one of the plurality of threads.

17. The system of claim 8, wherein the sender interface is further configured to initialize sender credits that indicate a number of entries that are available in the FIFO storage to store data by issuing one sender credit to the shared class and one sender credit to the dedicated class in response to the reset signal.

18. The system of claim 8, wherein the sender interface is further configured to receive a class limits input that specifies the first number of entries in the FIFO storage and the second number of entries in the FIFO storage and that changes while data is stored in the FIFO storage.

* * * * *